United States Patent [19]

Adee

[11] Patent Number: 5,062,489

[45] Date of Patent: * Nov. 5, 1991

[54] FOLDING AGRICULTURAL IMPLEMENT

[76] Inventor: Raymond A. Adee, 1504 Terrace Dr., Newton, Kans. 67114

[ * ] Notice: The portion of the term of this patent subsequent to Aug. 7, 2007 has been disclaimed.

[21] Appl. No.: 564,443

[22] Filed: Aug. 7, 1943

Related U.S. Application Data

[63] Continuation-in-part of Ser. No. 395,280, Aug. 16, 1989, Pat. No. 4,945,997.

[51] Int. Cl.$^5$ ............................................. A01B 73/06
[52] U.S. Cl. ................................... 172/311; 172/456; 172/677; 111/57
[58] Field of Search ............... 172/310, 311, 313, 324, 172/452, 456, 669, 673, 677, 776; 280/411.1, 412, 413, 656; 111/53-57

[56] References Cited

U.S. PATENT DOCUMENTS

| 4,137,852 | 2/1979 | Pratt | 280/656 X |
| 4,171,022 | 10/1979 | Applequist | 172/456 X |
| 4,504,076 | 3/1985 | Bedney | 280/412 X |
| 4,518,046 | 5/1985 | Rettig et al. | 172/311 |
| 4,660,651 | 4/1987 | Pfenniger et al. | 172/311 |
| 4,664,202 | 5/1987 | Applequist et al. | 172/311 |
| 4,721,167 | 1/1988 | Salley et al. | 172/311 |
| 4,723,787 | 2/1988 | Hadley et al. | 172/311 |
| 4,763,915 | 8/1988 | Risser | 172/311 X |

Primary Examiner—Dennis L. Taylor
Assistant Examiner—Jeffrey L. Thompson
Attorney, Agent, or Firm—Litman, McMahon & Brown

[57] ABSTRACT

A foldable agricultural implement for use in a towed relationship with a tractor, wherein a pair of outboardly wheeled implement frames or wings carrying around working tools are rotatably and pivotally supported at their inboard ends by a wheeled rear carrier. The implement frames are connected to the rear carrier by ball-and-socket joint assemblies and are pivotally and rotatably connected to a towing means by a twin tongue assembly, adapted so that the work performing means are capable of maneuvering and closely following the contours of a field and folding forward and elevating to provide ground clearance for transport.

20 Claims, 8 Drawing Sheets

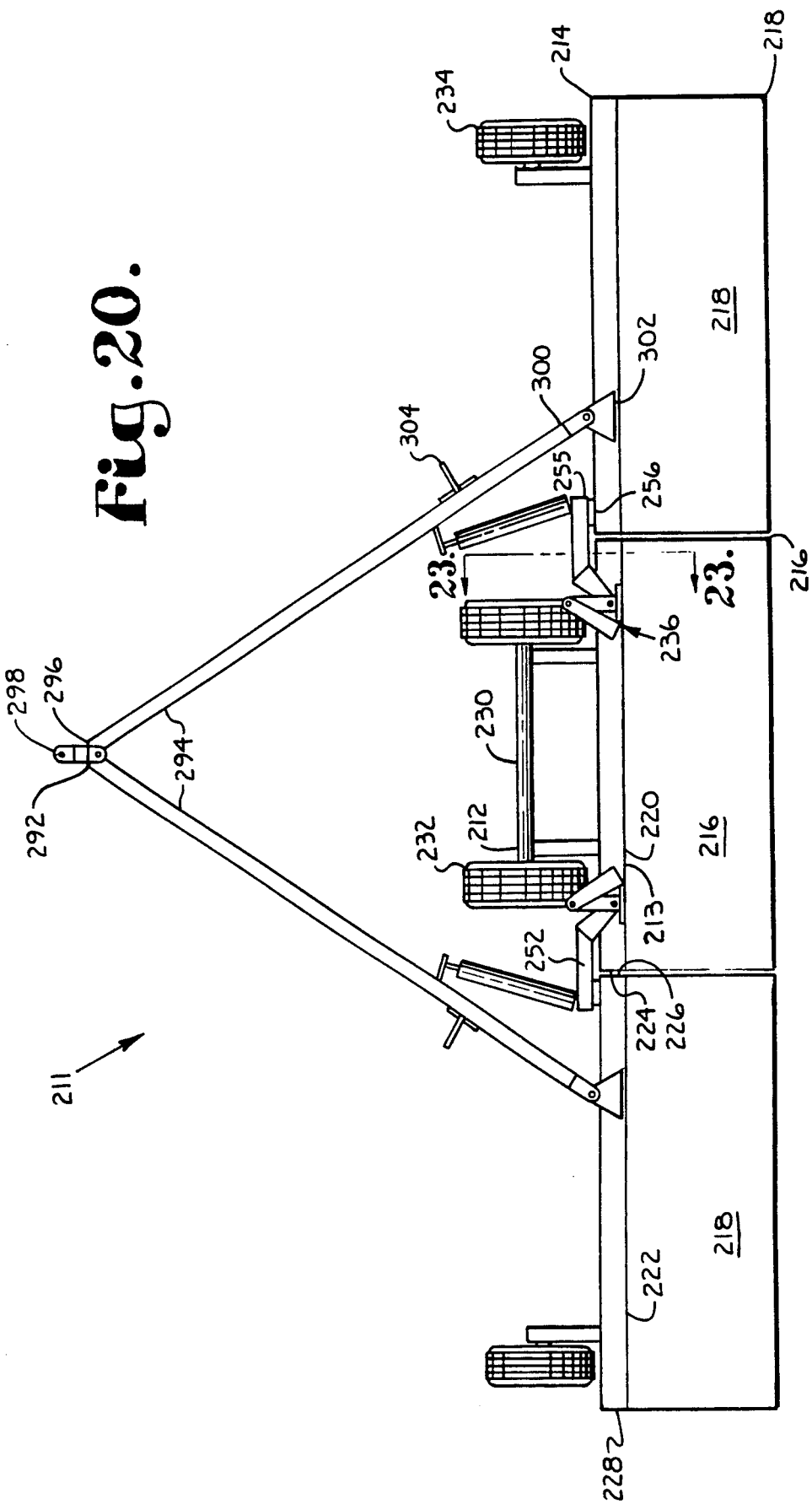

FOLDING AGRICULTURAL IMPLEMENT

CROSS-REFERENCE TO RELATED APPLICATION

This is a continuation-in-part of copending U.S. patent application Ser. No. 07/395,280, filed Aug. 16, 1989, entitled FOLDING AGRICULTURAL IMPLEMENT which is now U.S. Pat. No. 4,945,997, said application being incorporated herein by reference.

BACKGROUND OF THE INVENTION

The present invention relates to foldable agricultural implements designed to be used in a towed relation to a tractor or other motive means. Particularly desirable in such devices are the abilities to be quickly folded for transport and unfolded for use in the field, and to perform work over a wide area while maintaining a uniform closely spaced relation between the ground-working means and the soil. Several devices currently available provide some of these desirable attributes, but do so at the sacrifice of the other attributes and practical necessities such as maneuverability, simplicity and stability. Typical problems include the need for long center tongues for foldability which decrease maneuverability; multiple complex hinges and universal joints for combining foldability and contour following which complicate construction and add expense; and requirements of more than four ground wheels for stability, which also adds expense.

Several currently available implements attempt to deliver these desirable attributes, but do so to a lesser degree than the present invention or do so inadequately. For instance, the ground clearance of some implements currently available is less than twelve inches, which is insufficient for travel over many rural roads and can result in damage to the implements if roadside hazards are struck, low ground clearance can also be insufficient for entrance to and exit from fields where ravines and rough terrain may be encountered. Other implements provide inadequate uniformity of proximity of the implement to the soil in the field causing erratic planting depth, which can result in crop damage and decreased yields. Lastly, the complexity of combining the desirable attributes unduly increases the cost of purchase and maintenance of those devices.

OBJECTS OF THE INVENTION

Therefore, the objects of the present invention are to provide: a foldable agricultural implement that incorporates a wide span in the field position with a compact size for transport; an apparatus that is maneuverable; an apparatus that provides sufficient ground clearance to travel over high crowned rural roads and to enter and exit fields over unlevel terrain; an apparatus that has only four ground wheels, and is stable when folding and transporting; an apparatus that has sufficient ground contour following capability so as to provide uniform proximity of ground working tools to the soil over the span of the implement; and an apparatus that is relatively simple to use, economical, and which is especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 20 is a top plan view of a folding implement comprising a first modified or alternative embodiment of the present invention, shown in its field or working position.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
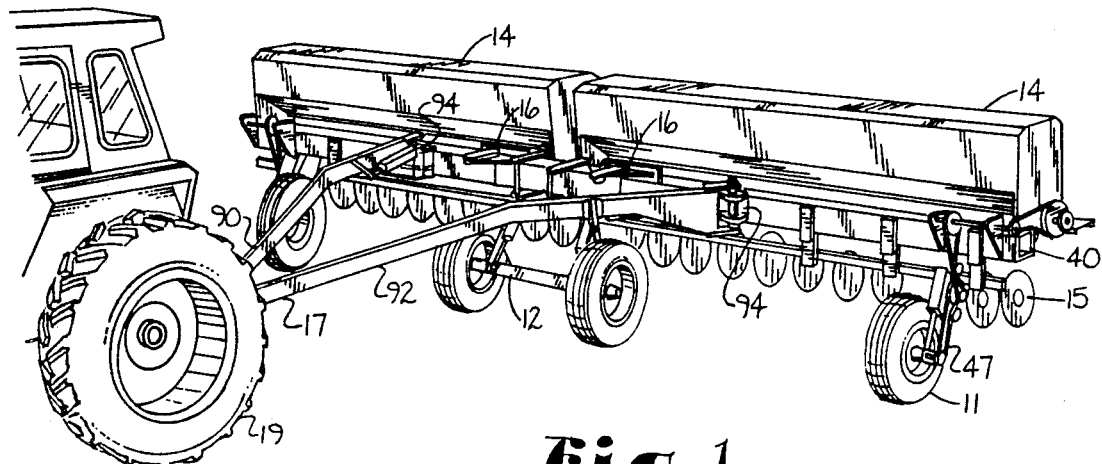
FIG. 1 is a perspective view of a folding agricultural implement in accordance with the present invention illustrated in conjunction with a tractor, showing the folding implement in a field position.

Referring to FIG. 1, the reference numeral 11 generally designates a folding agricultural implement in accordance with the present invention. The agricultural implement 11 generally comprises: a rear carrier 12; a pair of folding implement frames 14 carrying work performing means 15; a pair of ball and socket joint linkages 16 rotatably and pivotally connecting the implement frames 14 with the rear carrier 12; and a towing tongue assembly 17, connecting the implement frames 14 with a hitching means 18, which in turn is connected with a towing means 19.

II. Rear Carrier 12

Figure 2:
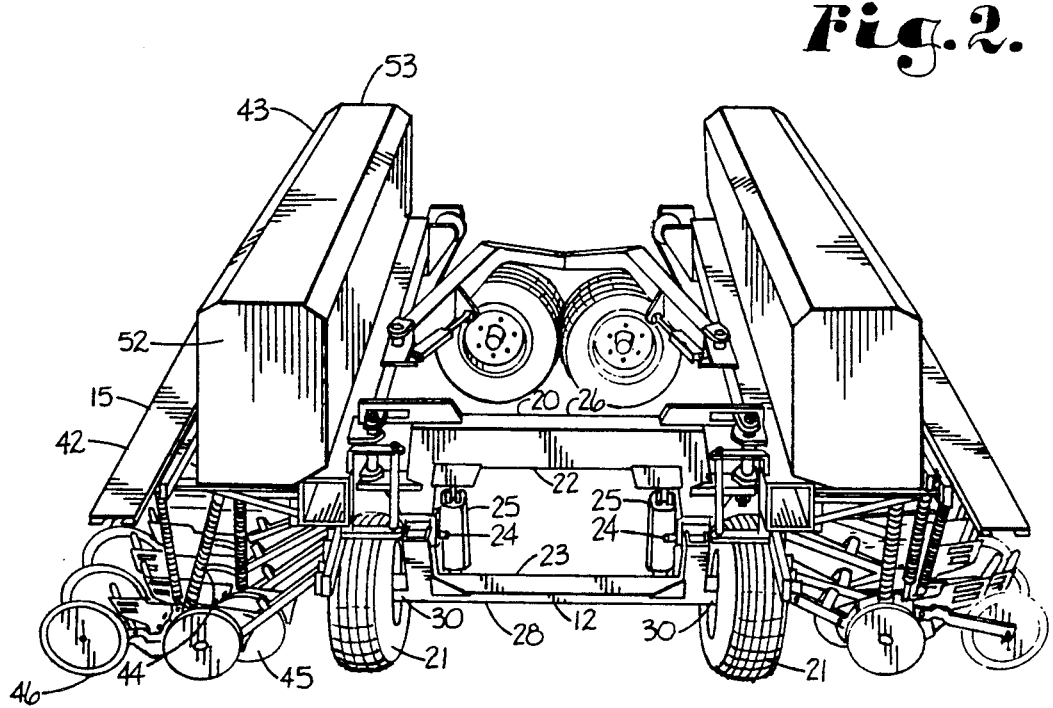
FIG. 2 is an enlarged perspective view of the folding implement, illustrating the implement in a transport position.

Referring to FIG. 2, the rear carrier 12 is located at the rear of the implement, and includes a frame 20 supported by a pair of ground wheels 21. In this description, the directional references "front", "rear", "inboard", "outboard", and the like are for reference only and are not intended to limit claims as such. The frame 20 is divided into an upper frame 22 and a lower frame 23. The upper frame 22 and the lower frame 23 are hingedly connected with a pair of hinges 24. The hinged connection permits adjustability of the height of the upper frame 22 relative to the ground. In the present embodiment, the height is adjustable hydraulically using the hydraulic cylinders 25. However, it is foreseen that alternate adjusting means, such as cams, screws, or the like could be used.

The rear carrier 12 can comprise a weldment constructed of rectangular cross-section box tubing members fabricated from steel. The upper and lower frames 22 and 23 respectively define downwardly and upwardly opening U-shapes joined at their distal ends by the hinges 24 to form a substantially rectangular enclosure when viewed from the front or rear. Viewed from the side, the upper and lower frames 22 and 23, form a forwardly opening obtuse, dihedral angle intersecting at the hinges 24 which varies with the height of the rear carrier 12, the angle being approximately 180 degrees at the maximum height. In operation, when the height of the rear carrier 12 is decreased, the lower frame 23 rolls forwardly and the angle formed by the upper and lower frames 22 and 23 decreases, thereby lowering the upper frame 22.

The width of the rear carrier 12 is defined by the common length of an upper cross-member 26 and a lower cross-member 28. The width selected for the present embodiment maximizes stability to prevent tipping while being sufficiently narrow for unrestricted transport over roads. The ground wheels 21 are rotatably connected at outboard ends 30 of the lower frame 22 and are positioned coaxially with the lower cross-member 28. The lower frame outboard ends 30 define right and left ends of the rear carrier 12 as viewed from the front or rear. This outboard positioning of the ground wheels 21, combined with the width of the rear carrier 12, provides additional stability and balance, thereby preventing tipping and eliminating a need for additional ground wheels.

III. Implement Frames 14

Figure 6:
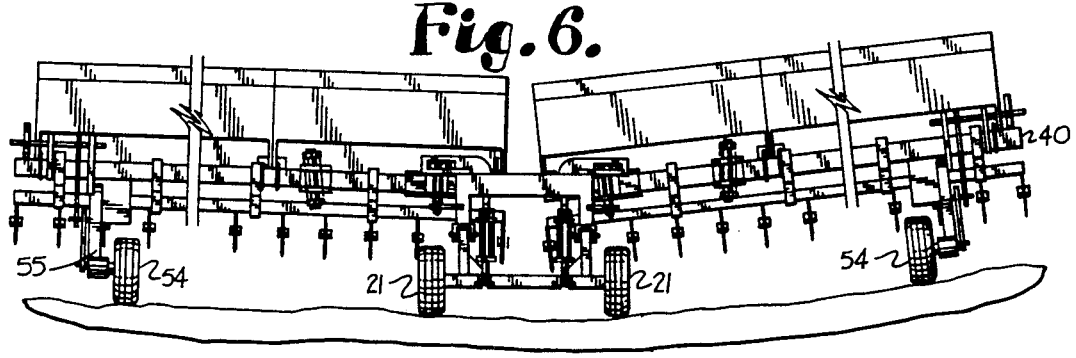
FIG. 6 is an enlarged, front elevational view of the implement showing the implement frames flexed upwardly in compliance with an environment having an upwardly sloping terrain.
Figure 7:
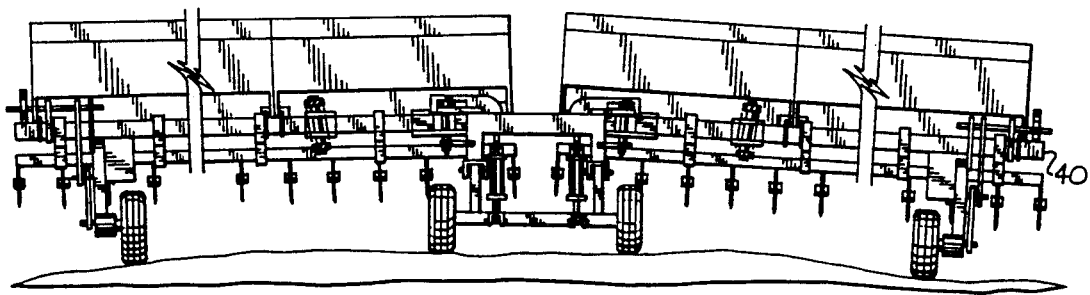
FIG. 7 is an enlarged, front elevational view of the implement showing the implement frames flexed downwardly in compliance with an environment having a downwardly sloping terrain.

The implement frames 14 comprise generally rectangular cross-section beams 40, constructed of steel in a supportive relationship with the work performing means 15 (see generally, FIGS. 1, 6 & 7). Referring again to FIG. 2, in the present embodiment, the work performing means 15 comprises a grain drill 42 and consists generally of hoppers 43 for holding a supply of seeds, seed chutes 44 for delivering the seeds to the soil, openers 45 that operate to open the soil for depositing seeds, closing wheels 46 that cover the seeds with soil, and a seed transmission 47 (see FIG. 1) for regulating the spacing between the plants. However, the present invention is not limited to an embodiment as a grain drill as it is foreseen that the invention could be embodied in a variety of agricultural implements, such as planters, cultivators, or the like.

Figure 3:
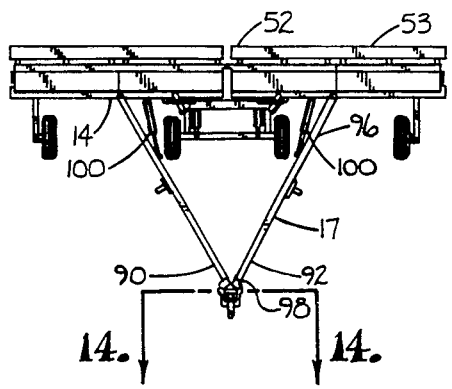
FIG. 3 is a reduced, top plan view of the implement in the field position.
Figure 4:
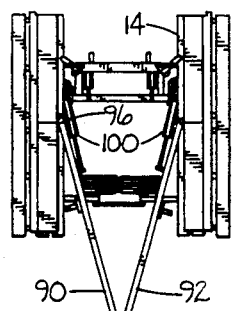
FIG. 4 is a reduced, fragmentary, top plan view of the implement, showing the implement frames in the transport position.

The implement frames 14 are movable between a field position (see FIGS. 1 and 3) and a transport position (see FIGS. 2 and 4). Additionally, each frame 14 has an inboard end 52 and an outboard end 53. In the field position, the inboard end 52 is the end in closest proximity to the rear carrier 12, and the outboard end 53 is farthest from the rear carrier 12 (see FIG. 3). When in the field position (see FIG. 3), the implement frames 14 are substantially transversely aligned with their inboard ends 52 closely spaced, providing seed placing capability across the width of the implement.

Referring to FIG. 4, in the transport position the implement frames 14 are folded forwardly, tilted inwardly, and are substantially parallel. As will be shown, foldability of the implement frames 14 is achieved by the combination of the rotatable and pivotable ball joint assemblies 16 and the rotatable relationship and orientation between the frames 14 and towing tongues 17 (see generally FIG. 5).

The implement frames 14 are supported by ground wheels 54, (see FIG. 6). The ground wheels 54, are rotatably mounted on the distal ends of the ground wheel arms 55, which are hingedly connected with the hinges 56 (see FIG. 15) to the implement frames 14 forward of the outboard ends 53. The heights of the implement frames 14 are adjustable by varying the angle of the hinges 56 in a similar manner to which the height of the rear carrier 12 is adjusted using the hinges 24. In the present embodiment, the heights of the frames 14 are adjustable hydraulically using hydraulic cylinders 57 (see FIG. 15).

IV. Ball and Socket Joint Linkages 16

The ball and socket joint linkages 16 rotatably and pivotably connect the implement frames 14 with the rear carrier 12. As discussed previously, rotatability of the implement frames 14 enables the implement 11 to be converted to and from the transport and field positions. As the implement frames 14 rotate forwardly about the ball and socket joint linkages 16 to the transport position, the outboard ends 53 raise and the frames 14 tilt slightly inwardly. As a result, in the transport position the outboard ends 53 are forwardly positioned and in a closely spaced relationship with the towing tongues 17. Additionally, the implement frames 14 are tilted inwardly, such that the tops of the seed hoppers 43 are in closer proximity with each other than are their bottoms, and the closing wheels 46 are raised several inches relative to their height in the field position. The objective of the tilting is to provide additional ground clearance for the ground working tools during transport over rough terrain, high crowned roads and the like. In the field position, pivotability of the ball and socket joint linkages 16 enables the implement frames 14 to flex independently upwardly and downwardly providing ground contour-following capability.

The ball and socket joint linkages 16 comprise a mechanically and geometrically somewhat complex assembly of components. To simplify the description of the linkages 16, as they are mirror images of each other, the linkages will be referred to singularly. As such, any reference thereto is not to be construed as limited to a single linkage 16, but should be construed as including both ball and socket joint linkages 16.

Figure 8:
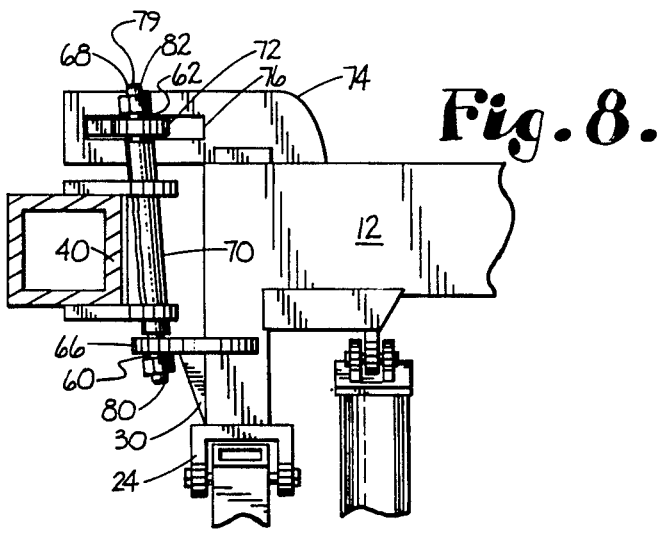
FIG. 8 is an enlarged, fragmentary, rear elevational view of the ball and socket joint assembly, showing the lower and floating ball and socket joints, lower carrier arm, link pin sleeve, links, and limiting bracket with the implement frame in the transport position.
Figure 9:
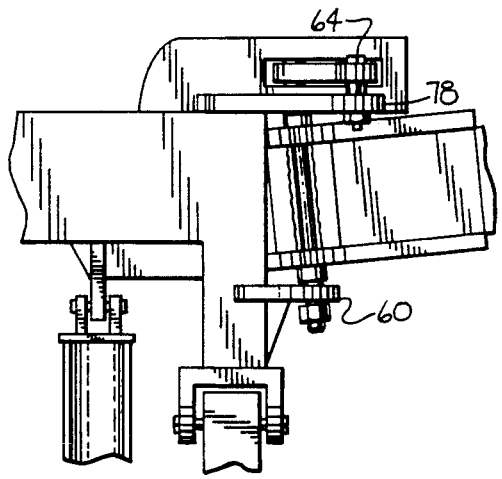
FIG. 9 is an enlarged, front elevational view of the ball and socket joint assembly showing the lower and upper ball joints, link pin sleeve, lower carrier arm, link and limiting bracket, with the implement frame in the field position.

Referring to FIGS. 8 and 9, the ball and socket joint linkage 16 includes three ball and socket joints: a lower ball and socket joint 60; a floating ball and socket joint 62; and an upper ball and socket joint 64. The ball and socket joint assembly 16 further includes: a lower carrier arm 66; a link pin 68 coaxially and rotatably located within a link pin sleeve 70; a link 72; a link limiting bracket 74 having a link slot 76; and an upper carrier arm 78.

Referring to FIG. 8, the lower ball and socket joint 60 is mounted on the lower carrier arm 66. The lower carrier arm 66 comprises a substantially horizontal plate constructed of steel welded to the outboard end 30 of the rear carrier 12 just above the hinge 24. The ball and socket joints 60, 62 and 64 commonly comprise a ball having a through bore, rotatably captured in a socket. The socket of the lower ball joint 60 is mounted in the steel plate of the lower carrier arm 66, with the axis of the through bore variably oriented at a small acute angle to vertical. The link pin 68 is a cylindrical member constructed of steel having an axis 79, a lower end 80, and an upper end 82. The lower end 80 is coaxially mounted on and threadedly fastened to the lower ball joint 60, the axis extending upwardly therefrom.

As described previously, the link pin 68 is coaxially and rotatably positioned in the link pin sleeve 70. The link pin sleeve 70 is a tubular member constructed of steel and rigidly mounted to the implement frame box beam 40 near the inboard end 52. The sleeve 70 is mounted on the beam 40 with the top end of the sleeve 70 closer to the inboard end 52 and in closer proximity with the beam 40 than the lower end. This orientation enables the top of the implement frame 14 to tilt inboardly and the outboard end 53 to elevate as the implement frame 14 is rotated to the transport position about the link pin 68. To limit the freedom of movement of the link pin 68 about the lower ball and socket joint 60, the upper end 82 connects to the rear carrier 12 via the floating ball and socket joint 62, link 72, upper ball and socket joint 64, and upper carrier arm 78.

Figure 10:
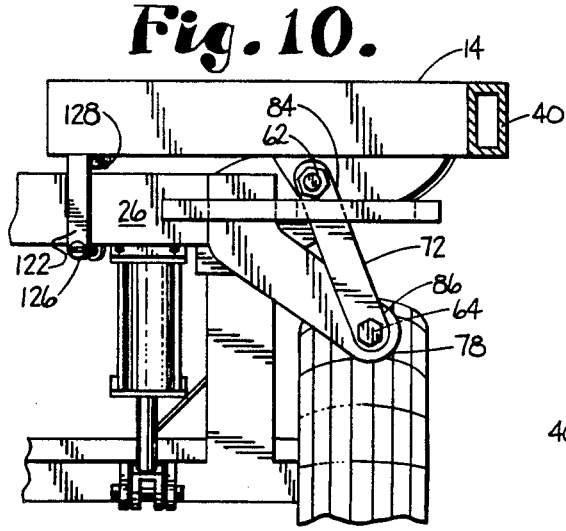
FIG. 10 is an enlarged plan view of the ball and socket joint assembly with the implement frame in the field position and flexed upwardly, showing the link angled corresponding to the flexing of the frame.
Figure 11:
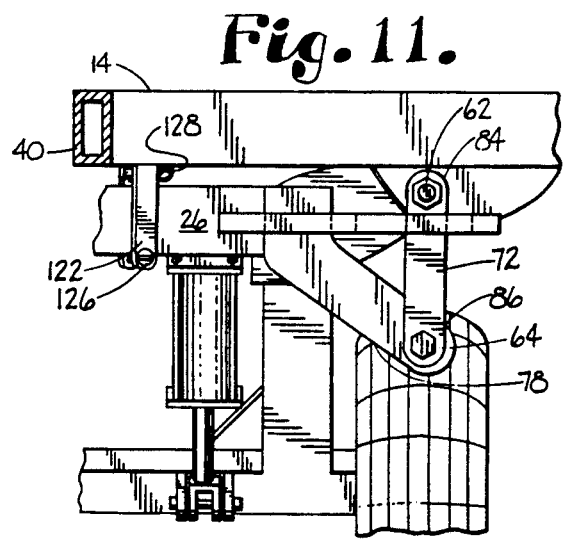
FIG. 11 is an enlarged plan view of the ball and socket joint assembly with the implement frame in the field position and flexed downwardly, showing the link angled corresponding to the flexing of the frame.

The link pin upper end 82 is coaxially mounted and threadedly fastened to the floating ball and socket joint 62. The floating ball and socket joint 62 is mounted on the link 72. Referring to FIGS. 10 and 11, the link 72 is a substantially horizontal, elongated member constructed of steel having a first end 84 and a second end 86. The floating ball and socket joint 62 is mounted on the first end 84. The upper ball and socket joint 64 is mounted on the second end 86 and connects the link 72 with the upper carrier arm 78.

Figure 5:
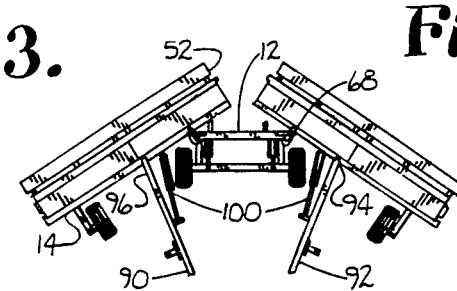
FIG. 5 is a reduced, fragmentary, top plan view of the implement, showing the implement in a partially folded configuration.

The upper carrier arm 78 is an elongated, substantially horizontal member welded to the top of the rear carrier 12 at the outboard end 30, projecting forwardly and outwardly therefrom. The upper ball and socket joint 64 is mounted on the distal end of the upper carrier arm 78 so as to provide an offset swing point about which the link 72 may rotate. During folding, as depicted in FIG. 5, the link 72 rotates about the upper ball and socket joint 64 and the link pin 68 rotates and pivots about the lower ball and socket joint 60. Similarly, during field operations depicted by FIGS. 6 and 7, as the implement frames 14 flex while following the ground contour, the link pin 68 pivots about the lower ball and socket joint 60. The pivoting action about the joint 60 causes the upper end of the link pin 68 to trace an arc as defined by the rotation of the link 72 about the upper ball and socket joint 64. FIGS. 10 and 11 show link 72 at different positions along the arc. FIG. 10 shows link 72 angled inwardly, corresponding to the implement frame 14 flexed upwardly. FIG. 11 shows link 72 angled slightly outwardly, corresponding to the frame 14 flexed downwardly.

The freedom of rotation of the link 72 about the upper ball and socket joint 64 is limited by the limiting bracket 74. Referring to FIG. 8, the limiting bracket 74 is an elongated, substantially vertical member constructed of steel and welded to the rear carrier 12 at the top of the outboard end 30, projecting outwardly therefrom. The limiting bracket 74 contains a link slot 76, through which the link 72 passes. The length of the slot 76 determines the maximum degrees of rotation of the link 72. Additionally, the limiting bracket 74 serves as a support which prevents the implement frame 14 from falling over when the link 72 has reached its maximum rotation and engages the limiting bracket 74 and when the implement 11 is converted to the transport position.

V. Towing Tongue Assembly 14

Rotatably and pivotably connecting the implement 11 to a towing means 19 is the towing tongue assembly 17. Referring to FIG. 1, the towing tongue assembly 17 generally comprises right and left negative dihedral members 90 and 92 respectively and a pair of hinges 94.

Figure 12:
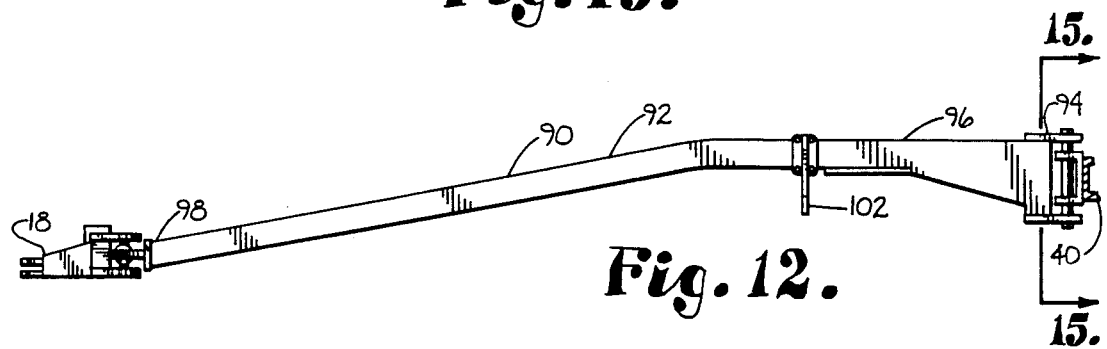
FIG. 12 an enlarged, fragmentary, side elevational view, showing the towing tongue.
Figure 13:
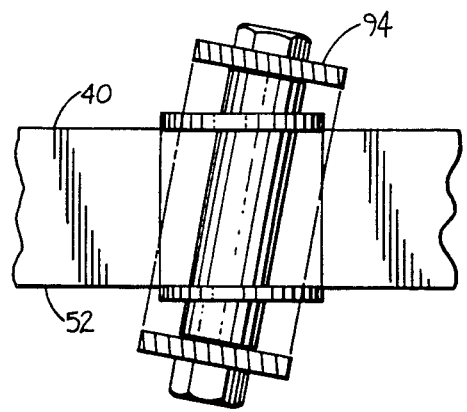
FIG. 13 is an enlarged, fragmentary, front elevational view showing the hinge which connects the towing tongue and implement frame.

Referring to FIG. 12, the members 90 and 92 are constructed of rectangular cross-section steel box beams and further comprise an implement end 96 and a hitch end 98. The implement ends 96 are those ends in proximity with the implement frames 14 and the hitch ends 98 are those ends in proximity with the towing means 19. The hinges 94 rotatably connect members 90 and 92 to the implement frames 14 at a point along the longitudinal axis of the frame 14 just inboard of the midpoint (see FIG. 3). The hinges 94 are mounted on the implement frame box beams 40 with the axes of the hinges 94 canted at a slight angle to vertical (see FIG. 13). The orientation of the hinge axes being such that the lower end of each hinge 94 is closer to the inboard end 52 than the upper end, this orientation facilitating the raising of the outboard end 53 when the implement 11 is converted to the transport position.

Referring again to FIG. 12, the members 90 and 92 project forwardly at a substantially horizontal orientation from the hinges 94, bending downwardly forming a dihedral angle to horizontal just forward of the point where the outboard ground wheels 54 intersect the members 90 and 92 when the implement is folded in the transport position. This configuration enables the groundwheels 54 to be retracted and towed (see FIG. 5) under the towing tongues 17 for transport.

Referring to FIGS. 3, 4 and 5, the tongue assembly 17 includes at the implement end 96 hydraulic cylinders 100 connecting members 90 and 92 to the implement frames 14 for converting the implement 11 to and from the transport position. When actuated so as to extend, the hydraulic cylinders 100 fold the implement frames 14 to the transport position. Retracting the cylinders 100 unfolds the implement frames 14 to the field position. Members 90 and 92 form a variable acute angle intersecting at their hitch ends 98, the angle being larger in the field position relative to the transport position. When extending, cylinders 100 cause the implement frames 14 to rotate simultaneously about the hinges 94 and link pins 68. While rotating, the inboard ends 52 swing rearwardly, causing the rear carrier 12 to roll backwardly. As the frames 14 rotate and the carrier 12 rolls, the angle formed by members 90 and 92 decreases. Likewise, when retracting, the frames 14 rotate inwardly and the carrier 12 rolls forwardly, with the angle between members 90 and 92 increasing. Referring again to FIG. 12, located toward the implement ends 96 on the outboard sides are implement support arms 102. In folding, as the implement frames 14 approach the transport position they engage the outboard tips of the arms 102, riding thereon and supported thereby in the transport position.

Figure 14A:
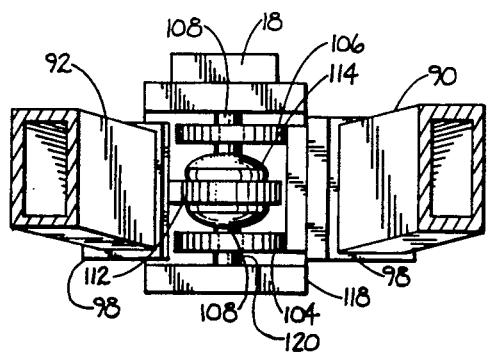
FIG. 14A is an enlarged cross-sectional rear view of the hitching means, towing tongues and ears.
Figure 14B:
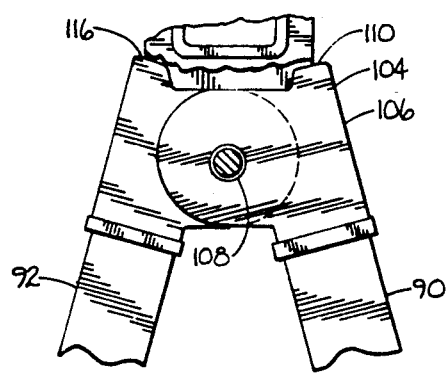
FIG. 14B is an enlarged, fragmentary, top plan view of the hitching means, towing tongues and ears.
Figure 21:
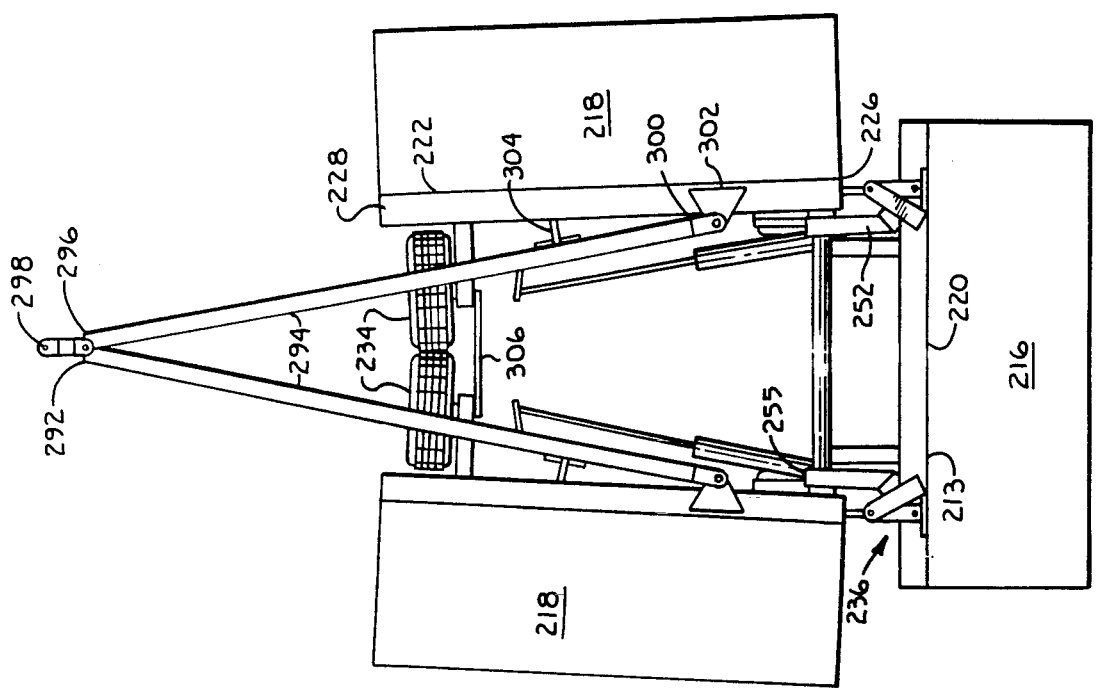
FIG. 21 is a top plan view of the modified implement, shown folded in its transport or storage configuration.
Figures 22, 23:
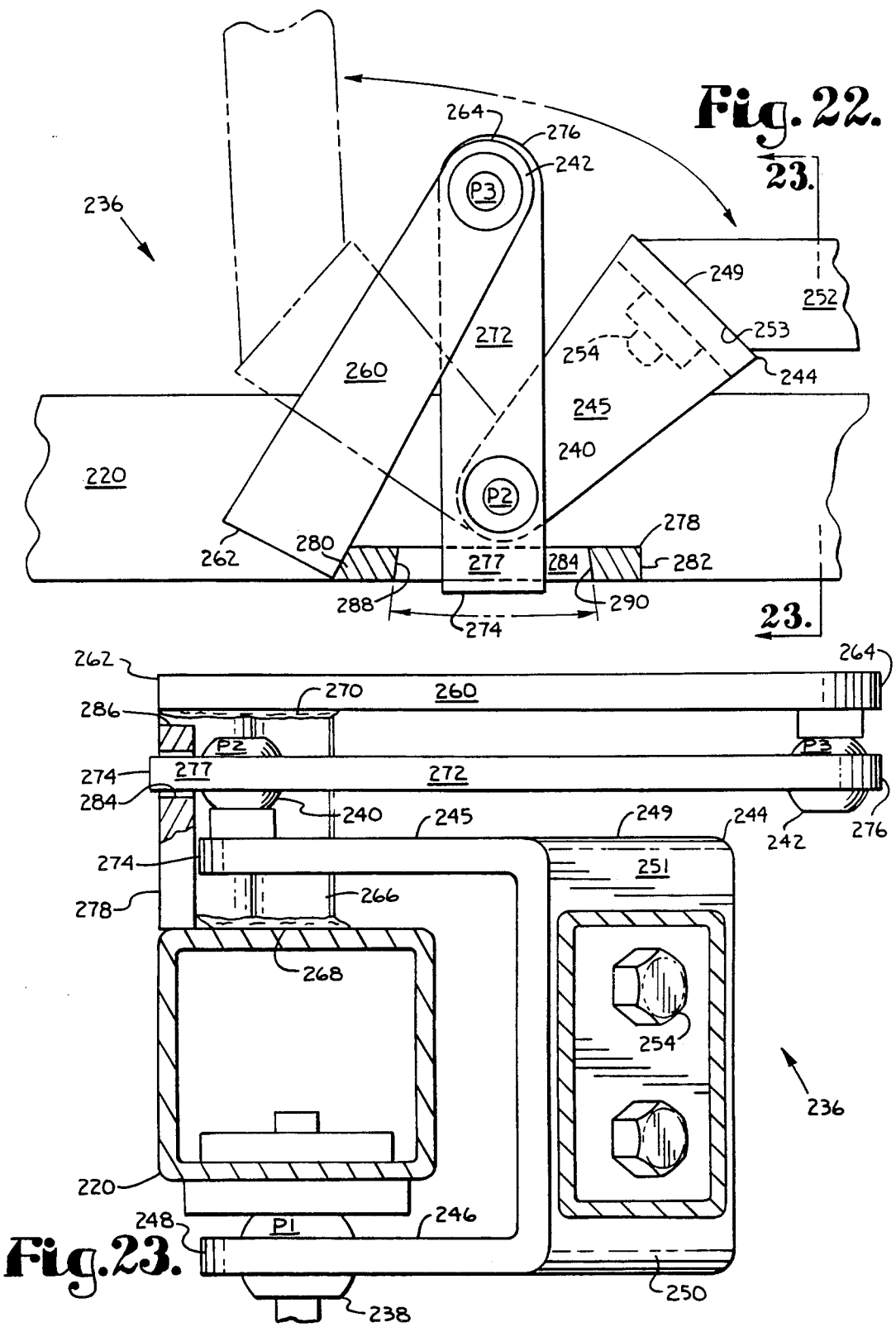
FIG. 22 is an enlarged, fragmentary, top plan view of the implement, particularly showing a hinge assembly thereof.
FIG. 23 is an enlarged, fragmentary, cross-sectional view of the hinge assembly taken generally along line 23-23 in FIGS. 20 and 22.

Referring to FIG. 14A, the members 90 and 92 connect with the hitch 18 at their hitch end 98. The right member 90 terminates with a pair of ears, lower ear 104 and upper ear 106, extending forwardly therefrom. Lower ear 104 is mounted on the lower, forward edge of member 90 and upper ear 106 is mounted on the upper edge. Ears 104 and 106 comprise substantially horizontal plates constructed of steel having vertical coaxial bores 108 therethrough. Referring to FIG. 14B, the ears 104 and 106 define a left hand dihedral projecting forwardly then extending left to the approximate centerline of the implement 11, the vertical centerline of the bores 108 falling on the approximate centerline of the implement 11. Located at the intersection of the dihedral and projecting forwardly therefrom are hardstops 110. Hardstop 110 engage the hitching means 18 when the member 90 has been rotated to its maximum counterclockwise position.

Referring again to FIG. 14A, the left member 92 terminates with a single ear 112 extending forwardly therefrom. Similar to ears 104 and 106, ear 112 comprises a substantially horizontal plate defining a right hand dihedral, constructed of steel. The left ear 112 is mounted at the approximate longitudinal centerline of member 92 and has a ball and socket joint 114 mounted thereon coaxially aligned with bores 108. Hardstop 116, located at the intersection of the dihedral projects forwardly therefrom, engaging the hitching means 18 when member 92 is rotated to its maximum clockwise position (see FIG. 14B).

The hitching means 18 includes a clevis 118 having a vertically aligned clevis pin 120. Clevis 118 engages ears 104, 106 and 112 with pin 120 passing through bores 108 and ball and socket joint 114. Right tongue member 90 is freely rotatable about pin 118 limited by hardstops 110. Left tongue member 92 is both rotatable and pivotable about pin 118 via ball and socket joint 114, independent of the right tongue member 90.

Rotatability of the towing tongue assembly 17 about hitching means 18 enables the implement 11 to be easily maneuvered in both the field and transport positions. The independent rotatability enables the angle between members 90 and 92 to vary between the field and transport positions so that in the field position when members 90 and 92 are spread apart, the implement 11 is more stable and the length of the implement 11 is shorter increasing maneuverability. Similarly, in the transport position when members 90 and 92 are close together, the implement 11 is narrow enough for transport over roads. The pivotability of member 92 independent of member 90, enables the implement frames 14 to flex independently, thereby enhancing ground contour following capability in the field position.

Figure 15:
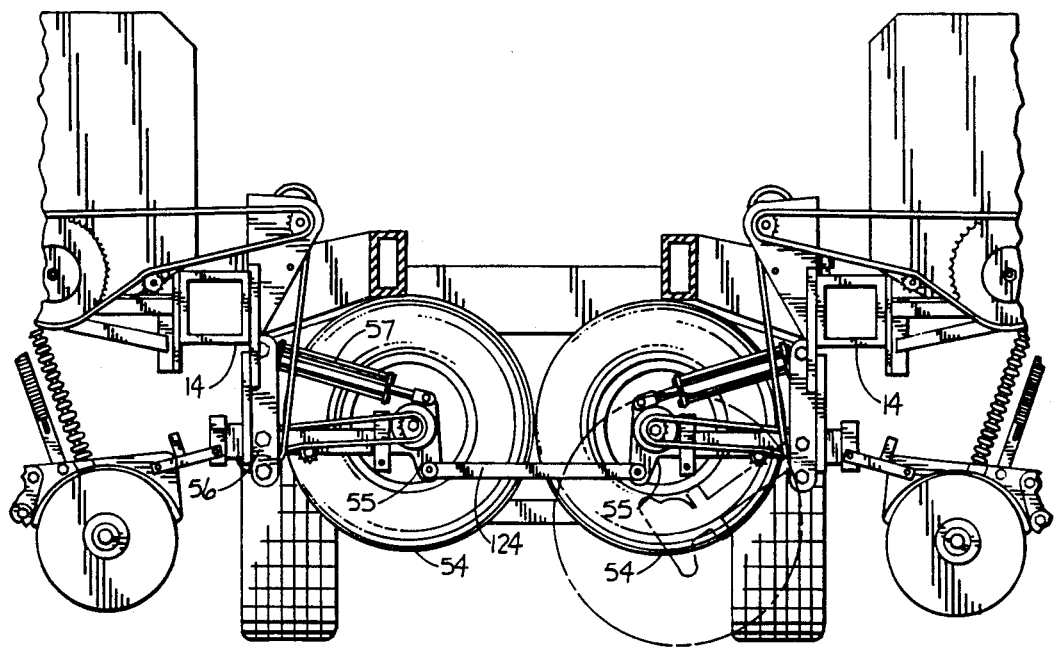
FIG. 15 is an enlarged, fragmentary, front elevational view of the implement in the transport position, showing the ground wheels retracted to their transport position and the locking bar in place, in phantom lines is shown a single ground wheel in the extended position.

As safety features, the implement 11 includes a pair of field position locking clevises 122, and a transport position locking bar 124. Referring again to FIGS. 10 and 11, the clevises 122 each comprise a pair of horizontally projecting arms mounted on the box beam 40 which straddle the upper crossmember 26 when the implement 11 is in the field position. A clevis pin 126 is engageable with the clevis 122 to prevent rotation of the implement frame 14 so as to secure the implement 11 in the field position. To ready the implement 11 for conversion to the transport position, pins 126 may be removed and stored in brackets 128, located adjacent to the clevises 122. Referring to FIG. 15, when the implement has been converted to the transport position and the ground wheels 54 have been retracted, the locking bar 124 is engageable with the ground wheel arms 55 so as to secure the implement frames 14 together and prevent their unfolding during transport and also to prevent the arms 55 from being lowered inadvertently. inadvertently. To ready the implement 11 for conversion to the field position, the locking bar 124 may be disengaged and the ground wheels 54 extended. Hydraulic cylinders 100 may then be retracted, thereby unfolding the implement 11.

VI. Operation of the Ball and Socket Joint Linkage

To illustrate the operation of the ball and socket joint linkages 16, schematic perspective views, FIGS. 16 through 19, will be referred to. FIGS. 16 through 19 are intended as simplified illustrations of the operation of the linkages 16. To achieve simplicity several components have been deleted, others being represented as plates and points. FIGS. 16 through 19 are intended to be illustrative, and as such should not be interpreted as limiting.

Figure 16:
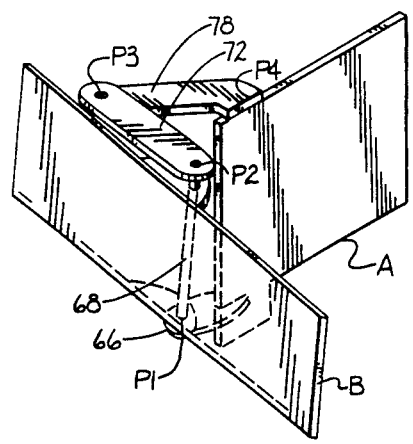
FIG. 16 is a schematic perspective rear view of the ball and socket joint assembly, showing the implement in the transport position.

Referring to FIG. 16, plate A represents the rear carrier 12 and plate B represents the implement frame 14. Points P1, P2, P3 and P4 represent the lower ball and socket joint 60, the floating ball and socket joint 62, the upper ball and socket joint 64, and the intersection of the upper carrier arm 78 and rear carrier 12 respectively. The angle formed by points P2, P3 and P4 (angle P234) represents the varying angles between the link 72 and upper carrier arm 78. The upper carrier arm 78, lower carrier arm 66, link 72 and link pin 68 are also shown.

In FIG. 16, which shows the implement 11 in the transport position, corresponding to FIGS. 2, 4 and 8, the longitudinal axis of B is shown at approximately 90 degrees to that of A. The plane of B is tilted slightly, the top edge being closer to A relative to the lower edge, representing the implement 12 in the transport position. In this position, angle P234 approximately forms a right angle with the intersection at P2 and link 72 substantially parallel to the longitudinal axis of plate B. The link pin 68, connecting P1 to P2 is oriented at a small acute angle to vertical, P2 being positioned just outboardly and rearwardly of P1, corresponding to the built-in angle of the link pin 68 relative to the implement frame 14. Because the length of link 72 prohibits P2 from being positioned directly over P1 and pin 68 is canted rearwardly and outwardly, when plate B is pivoted about P1 to the transport position, the longitudinal axis of plate B tilts with the forward end (outboard end 53) being raised relative to the rearward end (inboard end 52). The fixed angle between the link pin 68 and implement frame 14 tilts B slightly such that the top of B is closer to A relative to the bottom of B.

Figure 17:
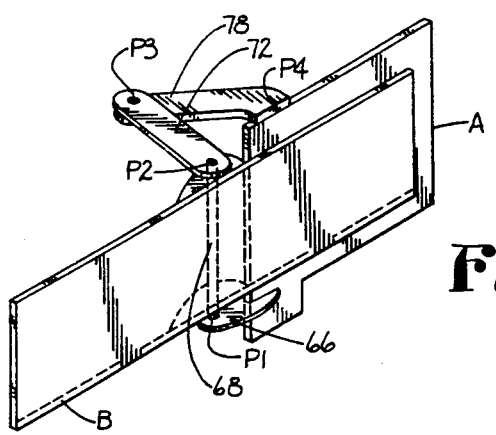
FIG. 17 is a schematic perspective rear view of the ball and socket joint assembly, showing the implement in the field position.

Referring to FIG. 17, which shows the implement 11 in the field position on level terrain, corresponding to FIGS. 1 and 9, plate B is shown oriented substantially parallel to plate A, having been rotated counterclockwise about P1. In this view, the implement 11 is illustrated on flat ground so that the longitudinal axes of A and B are substantially parallel and horizontal. This orientation is achievable while the link pin 68 remains slightly canted, with P2 rearward and outward of P1, because the link pin 68 is mounted at an angle to the implement frame 14. The angle of mounting permits the implement frame 14 to be tilted inwardly about its longitudinal axis, and the longitudinal axis to be tilted upwardly when in the transport position and the longitudinal axis to be substantially horizontal with no tilt in the field position.

Figure 19:
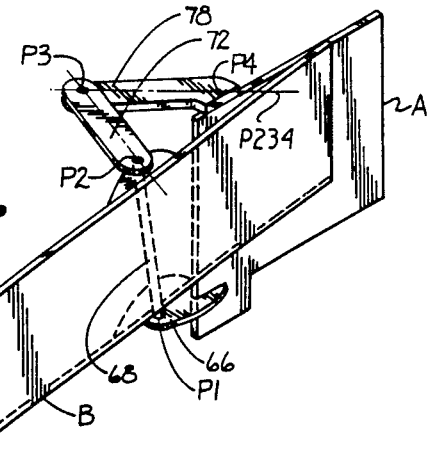
FIG. 19 is a schematic perspective rear view of the ball and socket joint assembly, showing the implement frame flexed downwardly.
Figure 18:
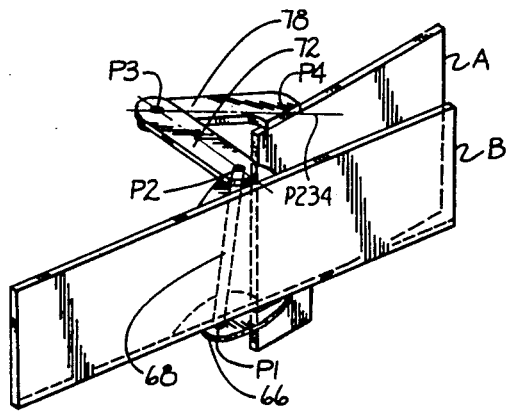
FIG. 18 is a schematic perspective rear view of the ball and socket joint assembly, showing the implement frame flexed upwardly.

FIGS. 18 and 19 show the implement 11 in the field position with the implement frame (plate B) flexed downwardly and upwardly, corresponding to FIGS. 6 and 10, and FIGS. 7 and 11, respectively. Flexure, which occurs when the implement 11 encounters uneven terrain, is achieved by the pivoting about P1 of the link pin 68. As plate B (rigidly connected to the link pin sleeve 70) flexes downwardly, the link pin 68 swings in a clockwise rotation about the axis of P3 pivoting about P1, thereby increasing angle P234. Similarly, as plate B flexes upwardly, the link pin 68 rotates counterclockwise about P3 and pivots about P1, thereby decreasing angle P234. As discussed previously, the rotation of the link 72 is limited by the length of the link pin slot (not shown).

VII. Modified or Alternative Embodiment

A folding agricultural implement 211 comprising a first modified or alternative embodiment of the present invention is shown in FIGS. 20 through 23. The implement 211 generally includes a rear carrier 212 mounting a center section implement frame 213 and a pair of outer or outboard section implement frames 214. Without limitation on the generality of useful applications of the folding implement 211, the frames can mount center and outer implements 216, 218, which can comprise grain drills. The center and outer implement frames include center and outer section box beams 220, 222 with square, tubular, cross-sectional configurations. The center section beam 220 includes opposite ends 224 and the outer section beams include respective proximate/inner and distal/outer ends 226, 228. The center section beam 220 mounts a rear main carrier frame 230 which mounts a pair of transport wheels 232. Each outer section beam 222 mounts a ground wheel 234 adjacent to its outer end 228.

A pair of ball-and-socket hinge assemblies 236 are provided for foldably and pivotably connecting each center section beam end 224 with a respective outer section beam proximate end 228.

Each hinge assembly 236 includes a lower, fixed ball-and-socket joint 238 defining a lower pivot point P1; an upper, floating ball-and-socket joint 240 defining an upper, floating pivot point P2; and an upper, fixed ball-and-socket joint 242 defining an upper, fixed pivot point P3.

A clevis 244 includes upper and lower legs 245, 246 with rounded, distal ends 247, 248 and proximate ends 249, 250 interconnected by a clevis base leg 251. A mounting member 252 includes a beveled, mitre cut inner end 253 attached to the outside of the clevis base leg 251 by a mounting bolt 254 and an outer end 255 attached to the outer beam section proximate end 226 by a mounting bracket 256.

The lower leg proximate or inner end 250 is connected to the center section beam 220 underside by the lower ball-and-socket joint 238 for multi-axial or universal rotation about point P1.

An upper, stationary link 260 includes a proximate, rear end 262 and a distal, front, rounded end 264. A stationary link spacer or post 266 can comprise a tubular member with a generally rectangular cross-sectional configuration and can include a lower end 268 mounted on the top of the center section beam and an upper end 270 mounting the upper, stationary link 260 at its rear, proximate end 262.

A floating link 272 is positioned vertically generally between the clevis upper leg 245 and the stationary link 260. The floating link 272 includes a proximate or rear end 274 and a distal or front end 276. The floating link 272 is connected to the upper clevis leg proximate end by the floating ball-and-socket joint 240 at the pivot point P2. The floating link 272 is attached to the floating ball-and-socket joint 240 in spaced relation in front of its rear end 274, whereby a floating link extension 277 is provided between the floating link rear end 274 and the floating ball-and-socket joint 240. The floating link front end 276 is connected to the stationary link front end 264 by the upper, fixed ball-and-socket joint 242 at pivot point P3.

A link limiting bracket 278 includes an inner end 280 attached to the spacer 266 and an outer end 282. The link limiting bracket 278 can be mounted on top of the center section beam 220 substantially flush with its rear edge. A limit slot 284 extends horizontally and transversely along the link limiting bracket 278 in spaced relation below and generally parallel to an upper edge 286 of the bracket 278. The slot includes a slot inner end 288 which can be beveled inwardly-and-rearwardly, and a slot outer end 290 which can be beveled outwardly-and-rearwardly. The slot 284 receives the floating link extension 277 which can slide transversely between the slot ends or stops 288, 290, which limit its rotational arc.

A tongue assembly 292 includes a pair of tongues 294 with front ends 296 pivotally connected to a hitch subassembly 298 and rear ends 300 pivotally connected to the outer section beams in spaced relation outwardly from their inner ends by tongue hinge subassemblies 302. A pair of implement support arms 304 can be provided on the tongues 294 for supporting the outboard implement frames 214 in their transport positions. A transport position locking bar 306 can be provided for interconnecting the ground wheels 54 with the implement 211 in its transport configuration.

In operation, the implement 211 operates in much the same manner as the implement 11 described above, except that the modified or alternative implement 211 includes a center implement 216 which can comprise, for example, a grain drill. Since grain drills are available in various widths, grain drills of different widths can be combined in various configurations to provide overall widths in the field and transport configurations as desired. For example, all of the implements 216, 218 could have widths of ten feet. Alternatively, the center implement 216 could be ten feet wide and the outboard implements 218 fourteen feet wide for greater working width without any increase in transport width.

The outboard section implement frames 214 can swing through arcs of slightly more than ninety degrees for movement between transport positions (FIG. 20) extended outwardly approximately ninety degrees from a direction of travel to transport positions (FIG. 21) canted inwardly a few degrees from the direction of travel whereby the folded outboard sectopm implement frames 214 have a forwardly-and-inwardly converging transport configuration. The tires of the ground wheels 234 can thus engage each other to resiliently restrain and cushion the outboard implements 218 in their folded, transport positions. Folding and unfolding can be accomplished hydraulically, as with the implement 11 described above.

It is to be understood that while certain forms of the present invention have been illustrated and described herein, it is not to be limited to the specific forms or arrangement of parts described and shown. For example, the fixed links 260 can be attached with spacers or posts 266 positioned outboard of the link limiting brackets 278, instead of inboard of them as shown.

What is claimed and desired to be secured by Letters Patent is as follows:

1. A folding agricultural implement adapted to be connected in a towed relation to a tow vehicle, said implement comprising:
   (a) a rear carrier;
   (b) a center implement frame with a pair of opposite ends;
   (c) a pair of folding, outer implement frames each having an inner end rotatably and pivotally connected to a respective center implement frame end and an outer end;
   (d) said center and outer implement frames mounting work performing means;
   (e) said outer implement frames having field and transport positions;
   (f) said outer implement frames being oriented substantially perpendicular to the direction of travel in their field positions and substantially parallel to the direction of travel in their transport positions;
   (g) a pair of hinge assemblies each pivotally and rotatably connecting a respective outer implement frame to said center implement frame;
   (h) towing tongue means adapted for connecting said outer implement frames with a tow vehicle; and
   (i) said hinge assemblies each further comprising:
      (i) a floating ball-and-socket joint, said floating joint connecting to a first of said center implement frame or said outer implement frame;
      (ii) a fixed position ball-and-socket joint connecting with the second of said center implement frame or said outer implement frame; and
      (iii) a link, said link connecting said floating joint with said fixed joint so as to allow canting of said implement frame.

2. The invention of claim 1 wherein each said hinge assembly inclues:
   (a) a clevis including a lower leg connected to said center implement frame at a respective lower, fixed ball-and-socket joint and an upper leg connected to said floating ball-and-socket joint; and
   (b) said clevis being fixedly connected to said outer implement frame at said inner end thereof.

3. The invention of claim 2, which includes:
   (a) a fixed link arm with a proximate end connected to said center implement frame and a distal end;
   (b) a floating link with a distal end connected to said fixed link distal end by said upper, fixed ball-and-socket joint; and
   (c) said floating link being connected to said clevis upper arm by said floating ball-and-socket joint in spaced relation from said floating link distal end.

4. The invention of claim 3, which includes:
   (a) said floating link having an extension and a proximate end, said floating link extension projecting from said floating ball-and-socket joint to said proximate end; and
   (b) means for permitting said floating link to swing with respect to said fixed link about said upper, fixed ball-and-socket joint to accommodate canting between said center implement frame and said outer implement frame with said implement in its field configuration.

5. The invention of claim 4 wherein each said hinge assembly includes:
   (a) a link limiting bracket mounted on said center implement frame and including stop means for limiting the swinging of said floating link.

6. The invention of claim 5, which includes:
   (a) said link limiting means comprising a slot in said link limiting bracket, said slot slidably receiving said floating link extension.

7. The invention of claim 6, which includes:
   (a) said link limiting bracket slot having inner and outer ends forming stops for said floating link and selectively engageable by the proximate end thereof.

8. The invention of claim 3 wherein each said hinge assembly includes:
   (a) a post with a lower end attached to said center implement frame and an upper end attached to said fixed link proximate end.

9. The invention of claim 1 wherein:

(a) said outer implement frames converge inwardly and forwardly in their transport positions.

10. The invention of claim 9 wherein:
(a) said outer implement frames swing through arcs of slightly greater than ninety degrees between their field and transport positions.

11. A floating agricultural implement adapted to be connected in a towed relation to a tow vehicle, said implement comprising:
(a) a center implement frame with opposite ends;
(b) a pair of folding, outer implement frames each having a proximate end and a distal end and each being rotatably and pivotally connected to said rear carrier at said proximate end;
(c) said center and outer implement frames mounting work performing means;
(d) said outer implement frames having field and transport positions;
(e) said outer implement frames being oriented substantially perpendicular to the direction of travel in their field positions and substantially parallel to the direction of travel in their transport positions;
(f) a pair of hinge assemblies each pivotally and rotatably connecting a respective outer implement frame at its proximate end to said center implement frame at a respective end thereof;
(g) towing tongue means adapted for connecting said outer implement frames with a tow vehicle; and
(h) said hinge assembly including means for rotating a respective outer implement frame inwardly about its longitudinal axis as said outer implement frame is folded from its field position to its transport position whereby each said outer implement frame is at least partly retained in its transport position whereby each said outer implement frame is at least partly retained in its transport position by gravity, said rotating means including a first, fixed pivotal connection of said outer implement frame and said center implement frame and a second floating pivotal connection of said outer implement frame, said second pivotal connection being restrained with the implement in its transport position.

12. A folding agricultural implement adapted to be connected in a towed relation to a tow vehicle, said implement comprising:
(a) a rear carrier;
(b) a center implement frame mounted on said rear carrier and including opposite ends;
(c) a pair of folding, outer implement frames each having an inner end rotatably and pivotally connected to a respective center implement frame end and an outer end;
(d) said center and outer implement frames mounting work performing means;
(e) said outer implement frames having field and transport positions;
(f) said outer implement frames being oriented substantially perpendicular to the direction of travel in their field position and substantially parallel to the direction of travel in their transport positions;
(g) a pair of hinge assemblies each pivotally connecting a respective outer implement frame proximate end to a respective center implement frame end;
(h) towing tongue means adapted for connecting said outer implement frames with a tow vehicle; and
(i) each said hinge assembly including:

(1) first pivotal connection means pivotally connecting a respective outer implement frame to said center implement frame; and
(2) second pivotal means pivotally interconnecting a respective outer implement frame to said center implement frame and including link means having a rear end pivotally attached to a respective outer implement frame and a front end pivotally attached to said center implement frame.

13. The invention of claim 12 wherein:
(a) said first pivotal connection means comprises a lower, fixed ball-and-socket joint; and
(b) said second pivotal connection means includes a floating, upper ball-and-socket joint interconnecting said link means rear end and said clevis, and a fixed, upper ball-and-socket joint pivotally interconnecting said link means front end and said center implement frame end.

14. The invention of claim 13 wherein each said hinge assembly includes:
(a) said clevis having a lower leg connected to said center implement frame at said lower, fixed ball-and-socket joint and an upper leg connected to said floating ball-and-socket joint; and
(b) said clevis being fixedly connected to said outer implement frame at said proximate end thereof.

15. The invention of claim 14 wherein said link means includes:
(a) a fixed link arm with a proximate end connected to said center implement frame at a distal end;
(b) a floating link with a distal end connected to said fixed link distal end by said upper, fixed ball-and-socket joint; and
(c) said floating link being connected to said clevis upper arm by said floating ball-and-socket joint in spaced relation from said floating link distal end.

16. The invention of claim 15, which includes:
(a) said floating link having an extension and a proximate end, said floating link extension projecting from said floating ball-and-socket joint to said proximate end; and
(b) means for permitting said floating link to swing with respect to said fixed link about said upper, fixed ball-and-socket joint to accommodate flexure between said center implement frame and said outer implement frame with said implement in its field configuration.

17. The invention of claim 16 wherein each said hinge assembly includes:
(a) a link limiting bracket mounted on said center implement frame and including stop means for limiting the swinging of said floating link.

18. The invention of claim 17, which includes:
(a) said link limiting means comprising a slot in said link limiting bracket, said slot slidably receiving said floating link extension.

19. The invention of claim 12 wherein:
(a) each said implement frame includes a tubular beam with a generally square cross-sectional configuration.

20. The invention of claim 12 wherein:
(a) each said hinge assembly includes a clevis fixedly connected to one of said center implement frame end or a respective outer implement frame inner end and pivotally connected to the other of said center implement frame end or said outer implement frame inner end.

* * * * *

UNITED STATES PATENT AND TRADEMARK OFFICE
CERTIFICATE OF CORRECTION

PATENT NO. : 5,062,489

DATED : November 5, 1991

INVENTOR(S) : Raymond A. Adee

It is certified that error appears in the above-identified patent and that said Letters Patent is hereby corrected as shown below:

ON THE TITLE PAGE, ITEM [22], SHOULD READ

-- Filed: Aug. 7, 1990

Signed and Sealed this

Sixth Day of April, 1993

Attest:

STEPHEN G. KUNIN

*Attesting Officer*  *Acting Commissioner of Patents and Trademarks*